United States Patent
Hara et al.

(10) Patent No.: US 8,508,758 B2
(45) Date of Patent: Aug. 13, 2013

(54) IMAGE PROCESSING APPARATUS, IMAGE PROCESSING METHOD, AND COMPUTER READABLE MEDIUM STORING PROGRAM

(75) Inventors: Yuki Hara, Kanagawa (JP); Takashi Kondo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 407 days.

(21) Appl. No.: 12/888,989

(22) Filed: Sep. 23, 2010

(65) Prior Publication Data

US 2011/0235078 A1    Sep. 29, 2011

(30) Foreign Application Priority Data

Mar. 25, 2010   (JP) .................................. 2010-069749

(51) Int. Cl.
*G06F 15/00*    (2006.01)
*G06K 1/00*    (2006.01)

(52) U.S. Cl.
USPC ............................. 358/1.13; 358/1.1; 358/1.9

(58) Field of Classification Search
None
See application file for complete search history.

(56) References Cited

U.S. PATENT DOCUMENTS

| 2005/0174444 A1* | 8/2005 | Ueno ......................... 348/231.6 |
| 2006/0098229 A1* | 5/2006 | Matsunaga et al. ............ 358/2.1 |
| 2007/0083733 A1 | 4/2007 | Fujisawa et al. |

* cited by examiner

*Primary Examiner* — Thierry Pham
(74) *Attorney, Agent, or Firm* — Oliff & Berridge, PLC

(57) ABSTRACT

An image processing apparatus includes a reconfigurable processing unit that performs first image processing on first image data and that performs second image processing on second image data after completing the first image processing on the first image data, and a controller that controls the reconfigurable processing unit. The controller controls the reconfigurable processing unit so that preprocessing for performing the second image processing is performed in parallel with a processing operation on the first image data, the processing operation including the first image processing.

6 Claims, 13 Drawing Sheets

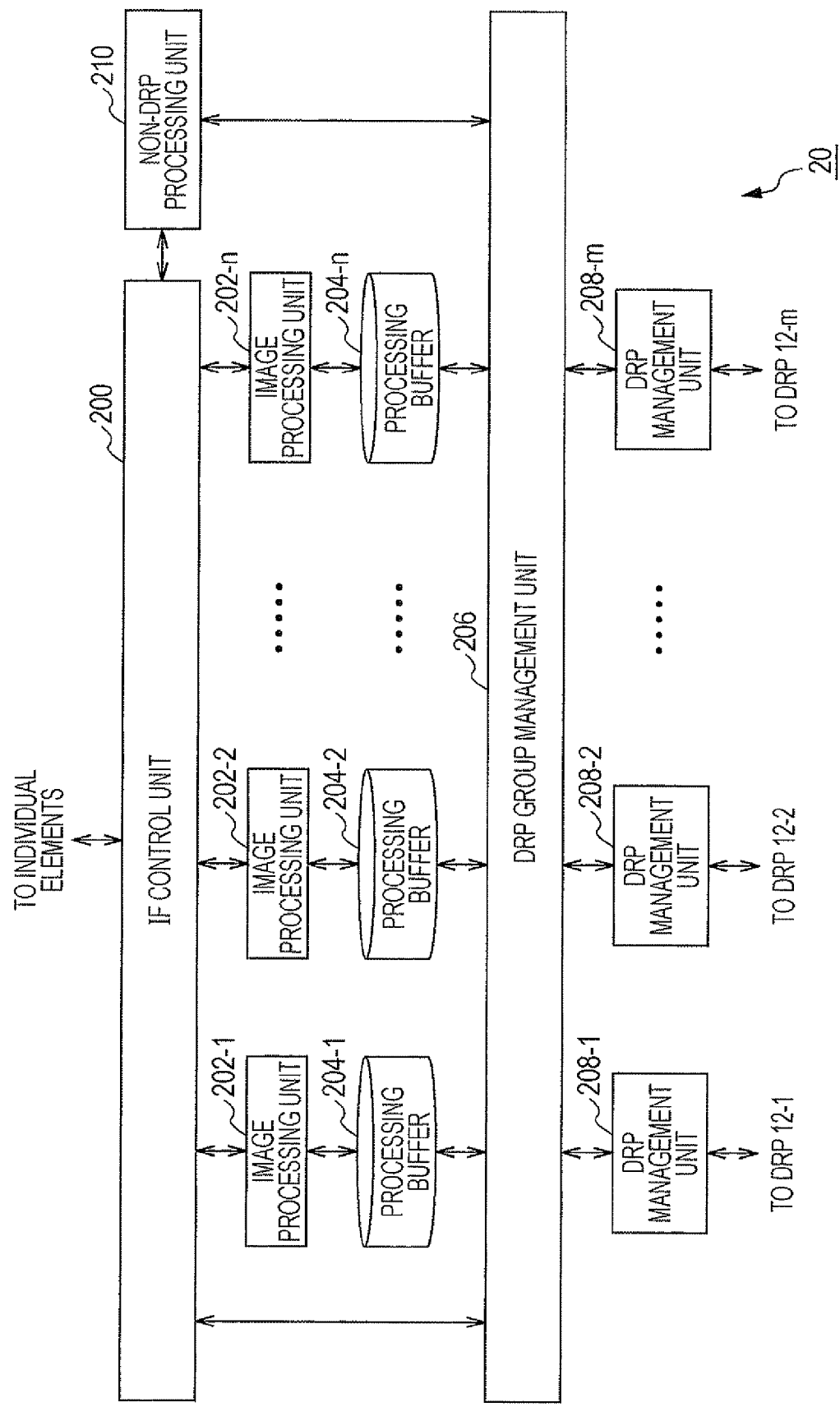

IMAGE PROCESSING APPARATUS, IMAGE PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-069749 filed Mar. 25, 2010.

BACKGROUND

Technical Field

The present invention relates to an image processing apparatus and an image processing method for processing image data to form an image on an image formation material, and also relates to a computer readable medium storing a program therefor.

SUMMARY

According to an aspect of the invention, there is provided an image processing apparatus including the following elements: a reconfigurable processing unit that performs first image processing on first image data and that performs second image processing on second image data after completing the first image processing on the first image data; and a controller that controls the reconfigurable processing unit. The controller controls the reconfigurable processing unit so that preprocessing for performing the second image processing is performed in parallel with a processing operation on the first image data, the processing operation including the first image processing.

BRIEF DESCRIPTION OF THE DRAWINGS

Exemplary embodiments of the present invention will be described in detail based on the following figures, wherein:

FIG. 4 is a diagram illustrating a configuration of an image processing control program according to the first exemplary embodiment, which realizes the forms of controlling image processing illustrated in FIGS. 3B to 3E;

DETAILED DESCRIPTION

[First Exemplary Embodiment]

Hereinafter, a first exemplary embodiment of the invention will be described.

Figure 1:
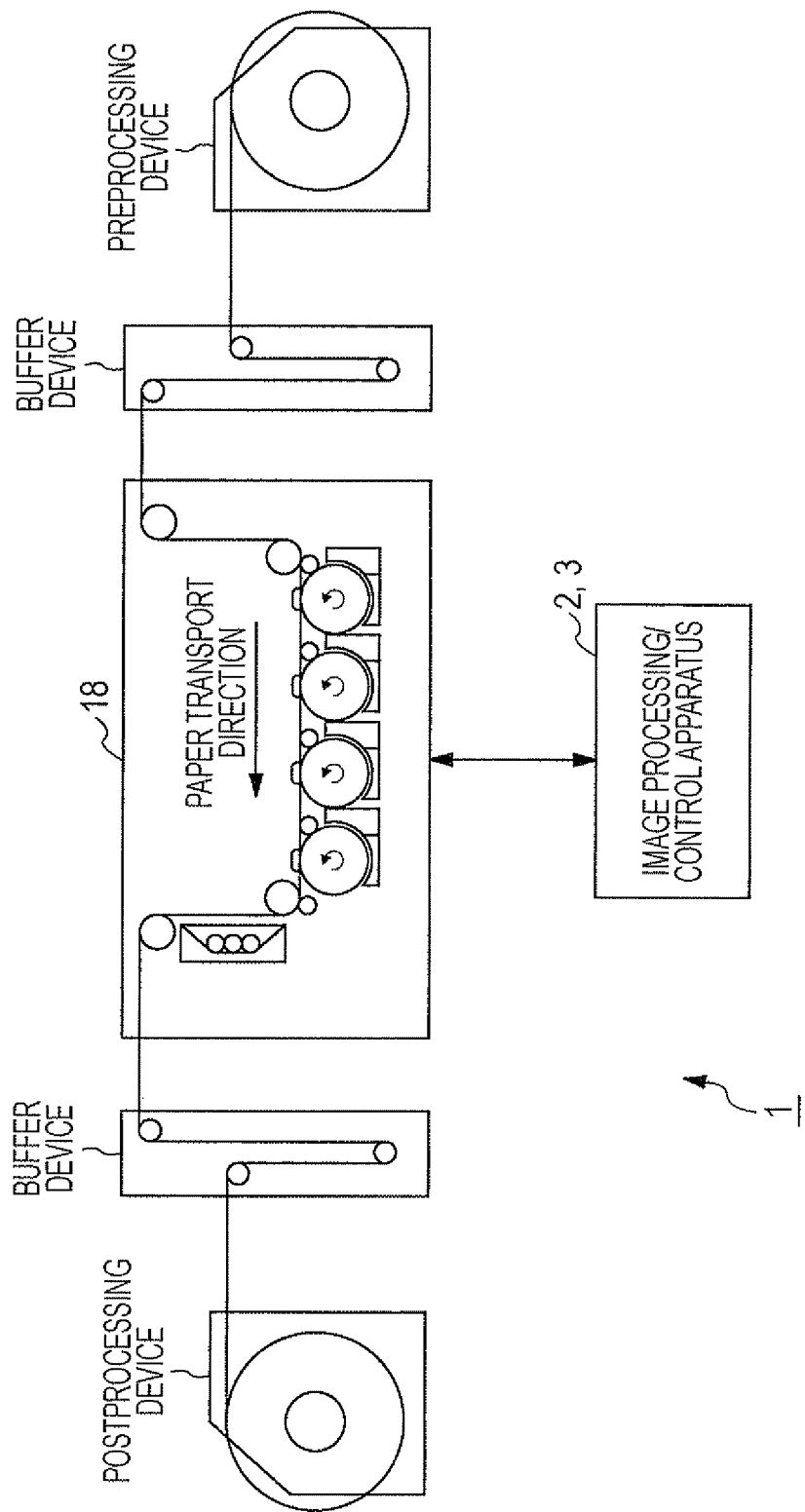
FIG. 1 is a diagram illustrating a configuration of a printer apparatus according to an exemplary embodiment of the invention.

FIG. 1 is a diagram illustrating a configuration of a printer apparatus 1 according to an exemplary embodiment of the invention.

As illustrated in FIG. 1, the printer apparatus 1 includes a paper feeder that feeds an image formation material (printing paper) on which an image of image data is to be printed, a print engine (image output terminal (IOT)) 18 that causes toner to be fixed onto the image formation material to form an image, an image processing/control apparatus 2, and a user interface (UI) device 106 (described below with reference to FIG. 2) that is used by a user to operate the printer apparatus 1.

That is, the printer apparatus 1 has elements serving as a printer that processes image data input through a network or the like and that forms an image on printing paper at high speed.

In the printer apparatus 1, the print engine 18 may be replaced by a print engine that forms an image on printing paper using a material other than toner, such as a print engine that forms an image on printing paper using an inkjet method.

Figure 2:
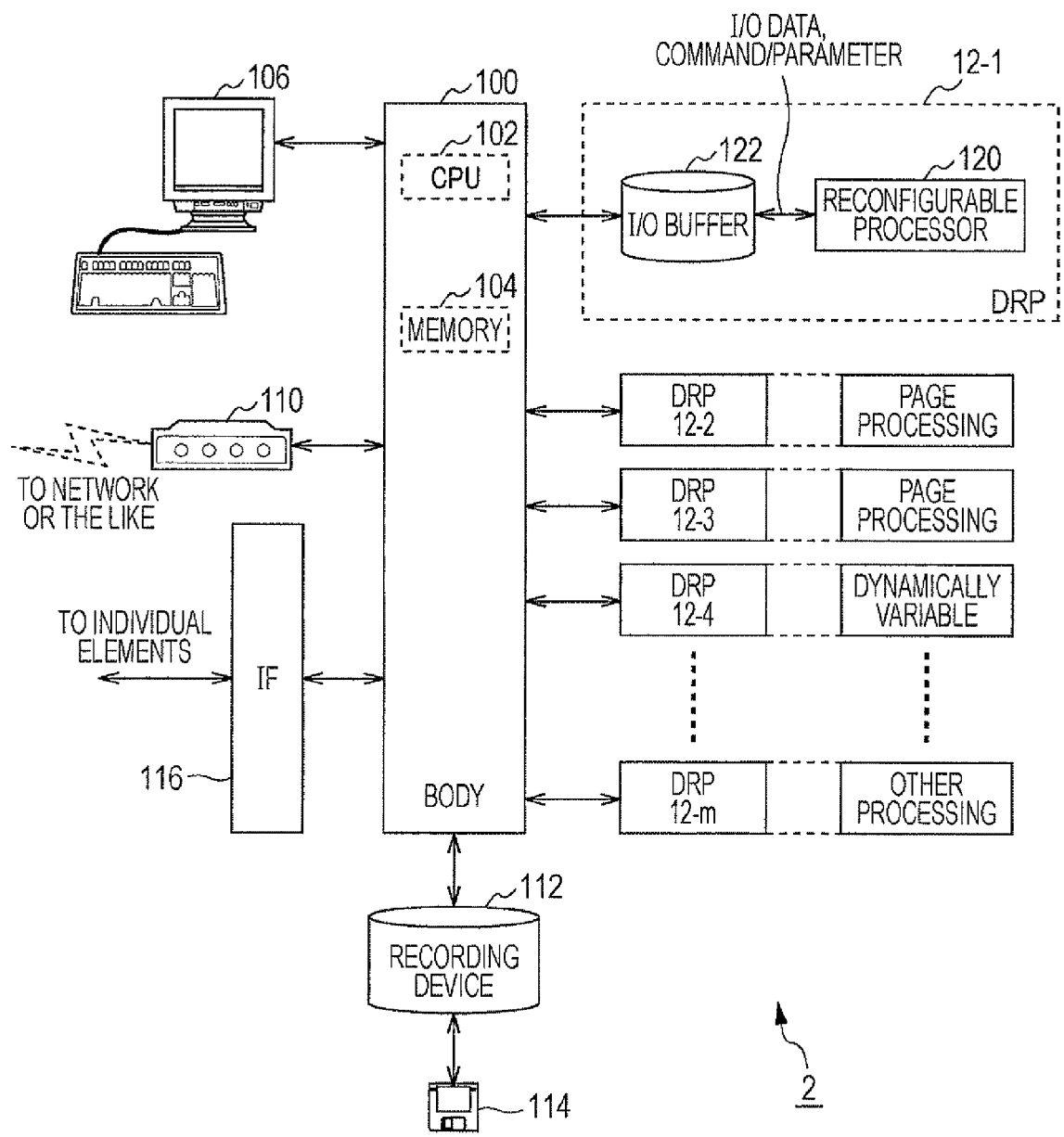
FIG. 2 is a diagram illustrating a hardware configuration of an image processing/control apparatus according to a first exemplary embodiment of the invention.

FIG. 2 is a diagram illustrating a hardware configuration of the image processing/control apparatus 2 illustrated in FIG. 1.

As illustrated in FIG. 2, the image processing/control apparatus 2 includes a body 100, the UI device 106, a communication device 110, a recording device 112, an interface (IF) circuit 116, and plural dynamically reconfigurable processors (DRPs) 12-1 to 12-m (m is an integer of two or more) serving as reconfigurable processing circuits.

Hereinafter, when any of elements that may be plural, such as the DRPs 12-1 to 12-m, is referred to while not being specified, the element is simply referred to as "DRP 12", for example.

In the individual figures, the parts that are substantially the same are denoted by the same reference numerals.

The body 100 includes a central processing unit (CPU) 102, a memory 104, and peripheral circuits thereof.

The UI device 106 includes a display, a keyboard, etc., and is used as a UI device of the printer apparatus 1.

The communication device 110 is used for communication performed with a computer (not illustrated) via a network, such as a local area network (LAN).

The recording device 112 writes information or data on/reads information or data from a recording medium 114, such as a flexible disk (FD), a compact disc (CD), a hard disk (HD), or a digital versatile disc (DVD).

The IF circuit 116 is used to input/output signals between the individual elements of the printer apparatus 1 and the body 100 and enables the image processing/control apparatus 2 to control the printer apparatus 1.

Each of the DRPs 12 has a configuration suitable for performing various types of image processing, such as page processing, raster image processing (RIP), and color adjustment processing in accordance with a command and a parameter supplied from the body 100, is configured to be specified by a command and a parameter, and includes a reconfigurable processor 120 that performs image processing and an input/output (I/O) buffer 122 that is used for receiving/transmitting data input from/output to the body 100 (I/O data), a command, and a parameter.

That is, the image processing/control apparatus 2 includes the DRPs 12 serving as elements for performing image processing at high speed, in addition to the elements serving as a computer capable of performing information processing, information communication, and control of the individual elements of the printer apparatus 1.

With those elements, the image processing/control apparatus 2 performs an image processing control program 20 that will be described below with reference to FIG. 4, thereby performing image processing on image data input thereto, such as RIP, color adjustment processing, and processing for generating a bitmap image that is used for image formation in the print engine 18, and control processing of controlling the individual elements of the printer apparatus 1 to perform image formation.

In the example illustrated in FIG. 2, the DRPs 12-1 to 12-3 are used only for page processing of generating a bitmap image from raster data of individual logical pages included in image data, the DRPs 12-5 to 12-m are used for image processing other than page processing (other processing), and the DRP 12-4 is used as a dynamically variable DRP that may be used for page processing and other processing.

[Forms of Controlling Image Processing]

Figure 3A:
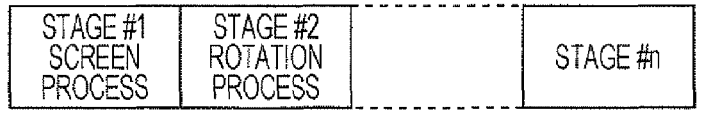
FIG. 3A illustrates a configuration example of image processing performed by the image processing/control apparatus illustrated in FIG. 2.

FIGS. 3A to 3E are diagrams illustrating a configuration example of image processing performed by the image processing/control apparatus 2 illustrated in FIGS. 1 and 2 and forms of controlling image processing. Specifically, FIG. 3A illustrates a configuration example of image processing, and FIGS. 3B to 3E illustrate forms of controlling image processing in a case where the dynamically variable DRP 12 that is performing other processing is requested to perform high-priority page processing of processing image data in real time in the DRPs 12 so that the print engine 18 may continuously perform image formation while the image formation is being performed in the printer apparatus 1.

The amount of the foregoing page processing of generating bitmap image data that is to be used for image formation in the print engine 18 from raster data obtained by performing RIP on individual logical pages included in image data is accurately calculated by the image processing/control apparatus 2 on the basis of the amount of raster data of each logical page, a parameter (e.g., dots per inch (DPI)) for creating bitmap image data from the raster data, the size of printing paper, etc.

The speed of image formation performed by the print engine 18 is also known, and thus a processing speed that is necessary for continuously performing image formation by the print engine 18 may be accurately calculated.

Furthermore, the processing speed in a case where the DRPs 12 are used for page processing is known, and thus the number of DRPs 12 that are necessary for continuously forming images of many logical pages included in image data on printing paper by using the print engine 18 may be accurately calculated.

For example, when the number of DRPs 12 that are to be used only for page processing is three or more and smaller than four, the DRPs 12-1 to 12-3 are used only for page processing, the DRP 12-4 is used as a dynamically variable DRP that performs both of page processing and other processing, and the DRPs 12-5 to 12-m are used for all types of processing other than page processing (RIP, color adjustment processing, etc.), as illustrated in FIG. 2.

As illustrated in FIG. 3A, image processing is typically composed of plural stages (stages #1 to #n, n is an integer of two or more, but is not constantly the same value) that may be performed independently of each other, such as a screen process and an image rotation process.

Hereinafter, a description will be given of, as a specific example, a case where the body 100 requests the dynamically variable DRP 12 to perform high-priority page processing composed of four stages while color adjustment processing composed of five stages is being performed by the dynamically variable DRP 12, thereby interrupting the color adjustment processing.

Figure 3B:
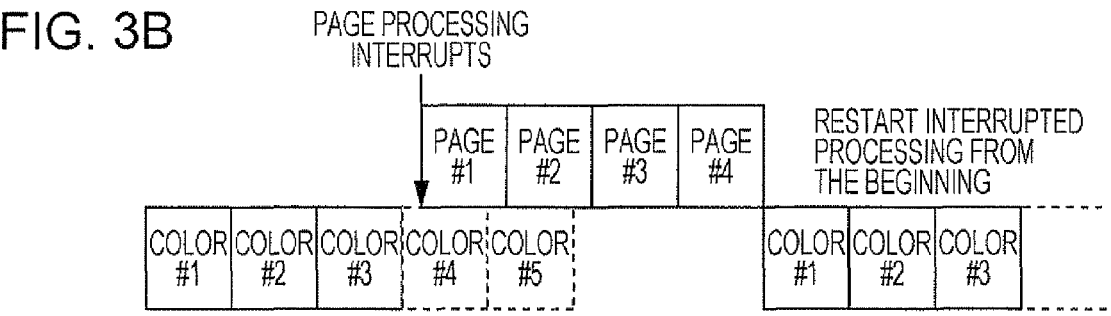
FIGS. 3B to 3E illustrate forms of controlling image processing.

In such a case, as illustrated in FIG. 3B, the body 100 may control the dynamically variable DRP 12 to suspend the color adjustment processing in stage #4, to perform the page processing composed of four stages, and to restart the interrupted color adjustment processing from the beginning after completing the page processing.

Figure 3C:
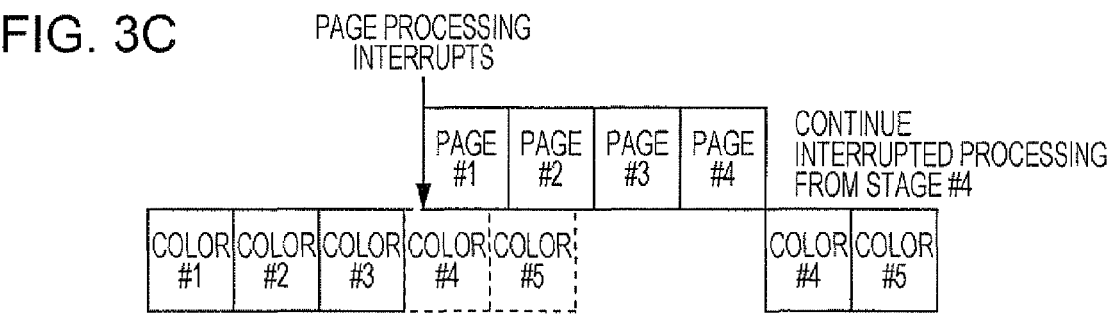

Also, as illustrated in FIG. 3C, the body 100 may control the dynamically variable DRP 12 to suspend the color adjustment processing (other processing) in stage #4, to perform the page processing, and to continue the interrupted color adjustment processing from stage #4 after completing the page processing.

Figure 3D:
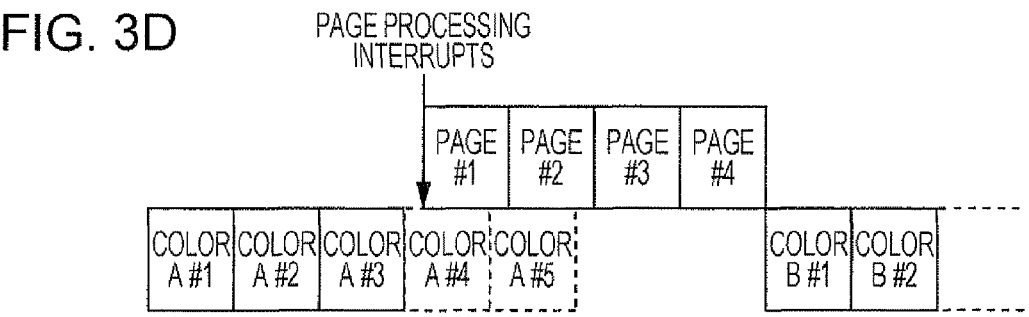

Also, as illustrated in FIG. 3D, the body 100 may control the dynamically variable DRP 12 to suspend the color adjustment processing (other processing) in stage #4 and to perform the page processing composed of four stages, and may perform the interrupted color adjustment processing from the beginning or stage #4 in parallel with the page processing.

Figure 3E:
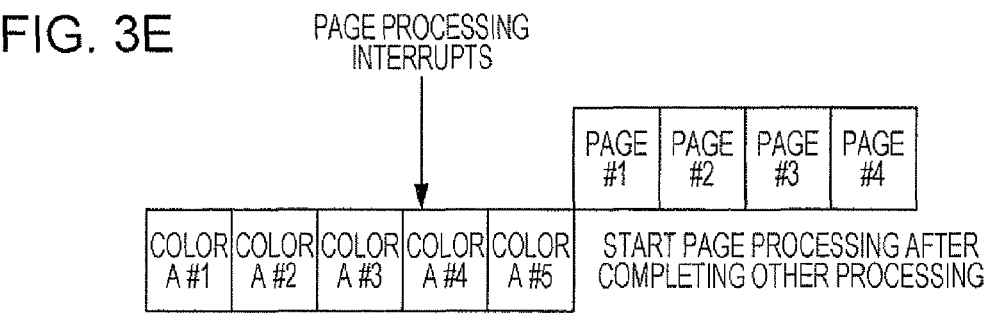

Also, as illustrated in FIG. 3E, the body 100 may control the dynamically variable DRP 12 to perform the color adjustment processing (other processing) to the end without interrupt in stage #4 and to perform the page processing after completing the color adjustment processing.

A form among the forms of controlling image processing illustrated in FIGS. 3B to 3E may be determined through an operation performed on the UI device 106 by a user who has instructed the printer apparatus 1 to perform image formation, or may be automatically determined by the image processing/control apparatus 2 for image data to be processed on the basis of the attributes of the image data to be processed (e.g., the size and color of the image).

Information showing the form of controlling image processing determined in this manner is added as additional information to the image data and is used for controlling image processing.

FIG. 4 is a diagram illustrating a configuration of the image processing control program 20 that realizes the control of image processing illustrated in FIGS. 3B to 3E.

In FIG. 4, the part unrelated to the first exemplary embodiment of the invention is appropriately omitted for clear illustration.

As illustrated in FIG. 4, the image processing control program 20 includes an IF control unit 200, an image processing unit 202-1 that performs page processing, image processing units 202-2 to 202-$n$ that perform other processing, processing buffers 204-1 to 204-$n$ that are provided for the respective image processing units 202-1 to 202-$n$, a DRP group management unit 206, DRP management units 208-1 to 208-$m$ that are provided for the respective DRPs 12-1 to 12-$m$, and a non-DRP processing unit 210.

The image processing control program 20 is supplied to the image processing/control apparatus 2 via a network or the recording medium 114, is loaded to the memory 104, and is performed with a specific use of hardware resources of the image processing/control apparatus 2 (this is the same for the other programs described below).

In the image processing control program 20, the IF control unit 200 transmits/receives signals that are necessary for operation of image formation or the like between the individual elements of the printer apparatus 1 and the body 100, so as to control the printer apparatus 1.

Also, the IF control unit 200 outputs information showing an operation that is input from the UI device 106 to the printer apparatus 1 to the image processing units 202, the DRP group management unit 206, and the non-DRP processing unit 210.

The non-DRP processing unit 210 requests the DRP group management unit 206 to perform processing that is necessary for realizing a specified operation in response to an operation of specifying the operation of the printer apparatus 1 performed on the UI device 106 by a user, or in response to an operation of specifying the operation of the printer apparatus 1 via a network, and supplies data, command, and image data therefor.

If the processing for performing the specified operation is performed by the dynamically variable DRP 12 in the form illustrated in FIG. 3D, the non-DRP processing unit 210 performs the processing suspended by the dynamically variable DRP 12.

Also, the non-DRP processing unit 210 outputs, to the individual elements of the printer apparatus 1 via the IF control unit 200, bitmap data or the like that is eventually obtained through processing in the image processing control program 20 and that is used for image formation in the print engine 18, and data that is used as signals necessary for controlling the individual elements of the printer apparatus 1.

The image processing unit 202-1 receives raster data on which page processing is to be performed, a command for providing an instruction of image formation, and a parameter that is necessary for the page processing from the IF control unit 200, and outputs the received raster data, command, and parameter to the DRP group management unit 206 via the processing buffer 204-1.

The image processing units 202-2 to 202-$n$ output image data on which image processing other than page processing, such as RIP, is to be performed, a command for providing an instruction of the image processing, and a parameter that is necessary for the image processing to the DRP group management unit 206 via the processing buffers 204-2 to 204-$n$, respectively.

The DRP group management unit 206 calculates the number of DRPs 12 that are necessary for page processing for the above-described continuous image formation in real time on the basis of the raster data on which page processing is to be performed, the command, and the parameter that are input via the processing buffer 204-1. Then, the DRP group management unit 206 sets the largest integer that is equal to or smaller than the calculated number of DRPs 12 as the number of DRPs 12 that are to be used only for page processing, and sets the DRPs 12 corresponding to the number as the DRPs 12 for page processing, as illustrated in FIG. 2.

If the calculated number of DRPs 12 is not an integer, the DRP group management unit 206 sets one of the DRPs 12 as the above-described dynamically variable DRP 12, and sets the other DRPs 12 as the DRPs 12 for use in processing other than page processing.

In this way, by providing one dynamically variable DRP 12, the processing ability for the processing other than page processing increases compared to a case where the dynamically variable DRP 12 is used as a DRP 12 for page processing. Furthermore, all the DRPs 12 are efficiently used without waste.

If the page processing requested via the processing buffer 204 may be performed with the processing ability of the DRP 12 for page processing, the DRP group management unit 206 outputs the raster data, command, and parameter that are necessary for the page processing to the DRP management unit 208 corresponding to the DRP 12 for page processing, thereby causing the page processing to be performed.

On the other hand, if the page processing requested via the processing buffer 204 may not be performed with the processing ability of the DRP 12 for page processing, the DRP group management unit 206 outputs the raster data, command, and parameter that are necessary for the page processing to the DRP management unit 208 corresponding to the dynamically variable DRP 12, thereby causing the page processing to be performed in the form associated with the page processing or the raster data (any of the forms illustrated in FIGS. 3B to 3E).

Likewise, if other processing requested via the processing buffer 204 may be performed with the processing ability of the DRP 12 for other processing, the DRP group management unit 206 outputs the image data, command, and parameter that are necessary for the processing to the DRP management unit 208 corresponding to the DRP 12 for other processing, thereby causing the other processing to be performed.

On the other hand, if the other processing requested via the processing buffer 204 may not be performed with the processing ability of the DRP 12 for other processing, the DRP group management unit 206 outputs the image data, command, and parameter that are necessary for the processing to the DRP management unit 208 corresponding to the dynamically variable DRP 12, thereby causing the other processing to be performed in the form associated with the other processing or the image data (any of the forms illustrated in FIGS. 3B to 3E).

The DRP management unit 208 outputs the image data (raster data), command, and parameter that are input from the DRP group management unit 206 to the reconfigurable processor 120 via the I/O buffer 122 of the DRP 12, and sets the command and parameter to the reconfigurable processor 120, thereby causing the image processing to be performed.

When being informed of the end of the image processing from the DRP 12, the DRP management unit 208 receives data that is obtained as a result of the processing via the I/O buffer 122, and outputs the data to the DRP group management unit 206.

[Operation of Image Processing/Control Apparatus 2 (image Processing Control Program 20)]

Hereinafter, a description will be given of operation of the image processing/control apparatus 2 (image processing control program 20), particularly of the control performed on the dynamically variable DRP 12.

Figure 5:
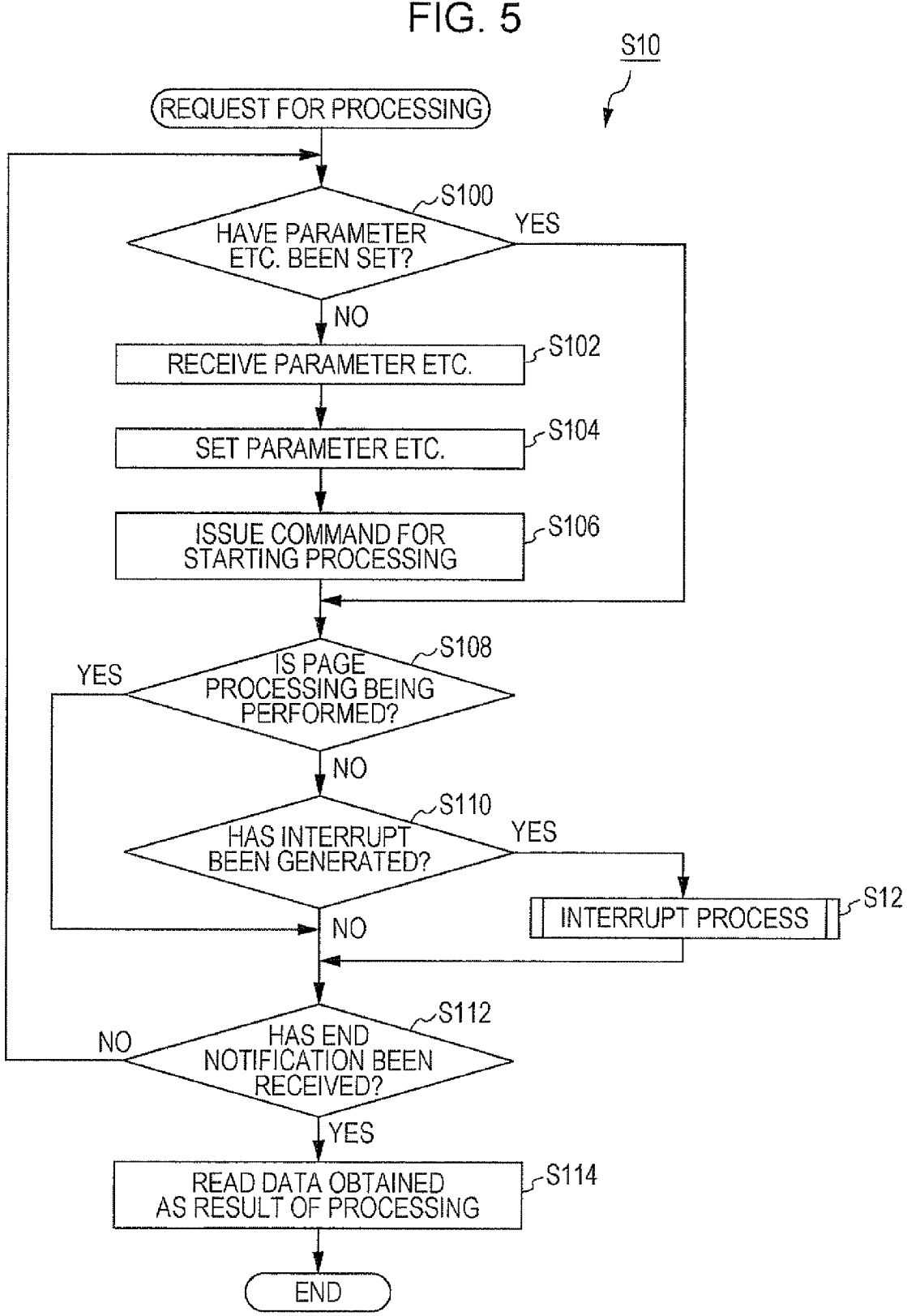
FIG. 5 is a flowchart illustrating operation of the image processing/control apparatus illustrated in FIG. 2 and the image processing control program illustrated in FIG. 4.

FIG. 5 is a flowchart illustrating operation (S10) of the image processing/control apparatus 2 illustrated in FIG. 2 (image processing control program 20 illustrated in FIG. 4).

Figure 6:
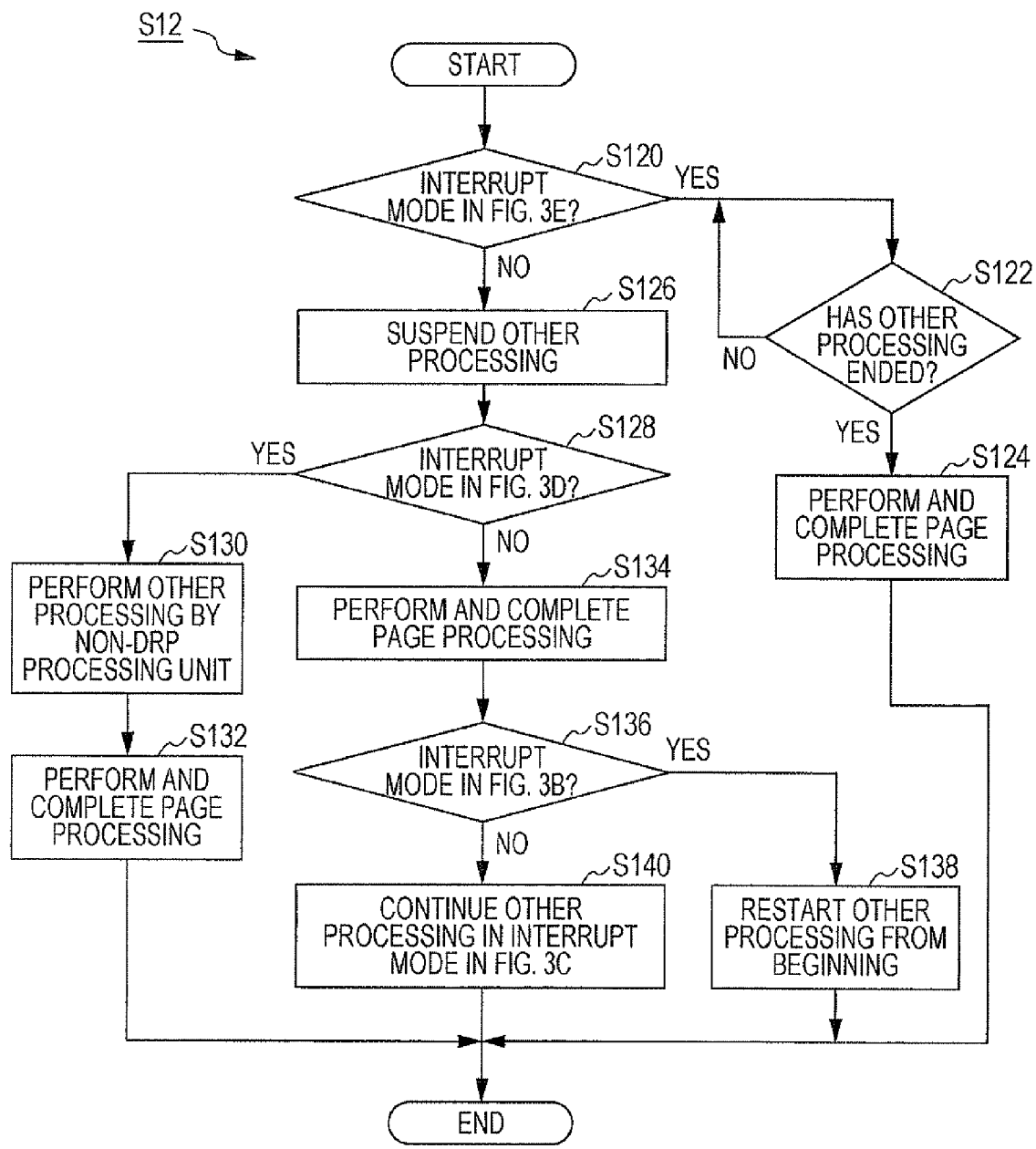
FIG. 6 is a flowchart illustrating an interrupt process illustrated in FIG. 5.

FIG. 6 is a flowchart illustrating an interrupt process (S12) illustrated in FIG. 5.

When an operation of requesting operation, such as image formation, is performed on the UI device 106 (FIG. 2) by a user, the user operation is output to the non-DRP processing unit 210 via the IF control unit 200, and the non-DRP processing unit 210 outputs data, command, and parameter for realizing the requested operation to each of the image processing units 202.

Referring to FIG. 5, in step S100, the DRP management unit 208 corresponding to the dynamically variable DRP 12 determines whether a parameter etc. have been set to the dynamically variable DRP 12 when the corresponding DRP 12 is requested to perform processing.

If the parameter etc. have been set to the dynamically variable DRP 12, the image processing control program 20 proceeds to step S108. Otherwise, the image processing control program 20 proceeds to step S102.

In step S102, the DRP management unit 208 receives the data, command, and parameter that are necessary for the requested processing from the DRP group management unit 206.

In step S104, the DRP management unit 208 outputs the command and parameter received in step S102 and the image data that is to be processed to the reconfigurable processor 120 via the I/O buffer 122 of the dynamically variable DRP 12.

In step S106, the DRP management unit 208 issues a command for starting the requested processing to the dynamically variable DRP 12, so as to start the processing.

In step S108, the DRP management unit 208 determines whether the dynamically variable DRP 12 is performing page processing.

If the dynamically variable DRP 12 is performing page processing, the image processing control program 20 proceeds to step S112. Otherwise, the image processing control program 20 proceeds to step S110.

In step S110, the DRP management unit 208 determines whether the DRP group management unit 206 has generated an interrupt for causing the dynamically variable DRP 12 to perform page processing.

If the DRP group management unit 206 has generated an interrupt for causing the dynamically variable DRP 12 to perform page processing, the image processing control program 20 proceeds to the interrupt process in step S12 (FIG. 6). Otherwise, the image processing control program 20 proceeds to step S112.

In step S112, the DRP management unit 208 determines whether the DRP management unit 208 has received a notification indicating that the processing that had being performed has ended from the dynamically variable DRP 12.

If the DRP management unit 208 has received the notification from the dynamically variable DRP 12, the image processing control program 20 proceeds to step S114. Otherwise, the image processing control program 20 returns to step S100.

In step S114, the DRP management unit 208 reads data that is obtained as a result of the processing from the reconfigurable processor 120 via the I/O buffer 122 and outputs the data to the DRP group management unit 206.

Upon receiving the data, the DRP group management unit 206 outputs the data to the non-DRP processing unit 210. The non-DRP processing unit 210 outputs the data to the print engine 18 of the printer apparatus 1 or use the data for the next processing performed in the image processing control program 20.

Referring to FIG. 6, in step S120, the DRP management unit 208 determines whether the interrupt mode corresponding to the page processing requested from the DRP group management unit 206 or the raster data input from the DRP group management unit 206 is an interrupt mode in the form of performing page processing after completing the other processing (processing other than page processing) that is being performed at the time, as illustrated in FIG. 3E.

If the interrupt mode is the interrupt mode in the form illustrated in FIG. 3E, the image processing control program 20 proceeds to step S122. Otherwise, the image processing control program 20 proceeds to step S126.

In step S122, the DRP management unit 208 determines whether the dynamically variable DRP 12 has completed the other processing.

If the dynamically variable DRP 12 has completed the other processing, the image processing control program 20 proceeds to step S124. Otherwise, the image processing control program 20 remains at step S122.

In step S124, the DRP management unit 208 causes the dynamically variable DRP 12 to perform the page processing. After the page processing has been completed, the image processing control program 20 proceeds to step S112 (FIG. 5).

In step S126, the DRP management unit 208 causes the other processing that is being performed by the dynamically variable DRP 12 to be suspended.

In step S128, the DRP management unit 208 determines whether the interrupt mode corresponding to the requested page processing is an interrupt mode in the form of causing the non-DRP processing unit 210 to perform the other processing that is being performed at the time, as illustrated in FIG. 3D, and notifies the DRP group management unit 206 of the determination result.

If the interrupt mode corresponding to the requested page processing is the interrupt mode in the form illustrated in FIG. 3D, the image processing control program 20 proceeds to step S130. Otherwise, the image processing control program 20 proceeds to step S134.

In step S130, the DRP group management unit 206 notifies the non-DRP processing unit 210 that the interrupt mode corresponding to the requested page processing is the interrupt mode in the form illustrated in FIG. 3D, and causes the non-DRP processing unit 210 to perform the other processing that is suspended by the dynamically variable DRP 12.

In step S132, the DRP management unit 208 causes the dynamically variable DRP 12 to perform the page processing. After the page processing has been completed, the image processing control program 20 proceeds to step S112 (FIG. 5).

In step S134, the DRP management unit 208 causes the dynamically variable DRP 12 to perform and complete the page processing.

In step S136, the DRP management unit 208 determines whether the interrupt mode corresponding to the requested page processing is an interrupt mode in the form where the other processing that is being performed at the time is restarted from the beginning after the page processing has been completed, as illustrated in FIG. 3B.

If the interrupt mode corresponding to the requested page processing is the interrupt mode in the form illustrated in FIG.

3B, the image processing control program 20 restarts the other processing that is suspended in step S126 from the beginning (step S138).

In step S140, the DRP management unit 208 determines that the interrupt mode corresponding to the requested page processing is the interrupt mode in the form illustrated in FIG. 3C, and continues the processing that is suspended in step S126 from the suspended stage.

[Modification]

Hereinafter, a description will be given of a modification of the first exemplary embodiment, that is, a process of the image processing/control apparatus 2 (image processing control program 20) in a case where the image processing control program 20 allocates the processing ability of the dynamically variable DRP 12 to page processing and processing other than page processing in a time-slotted manner.

Figure 7:
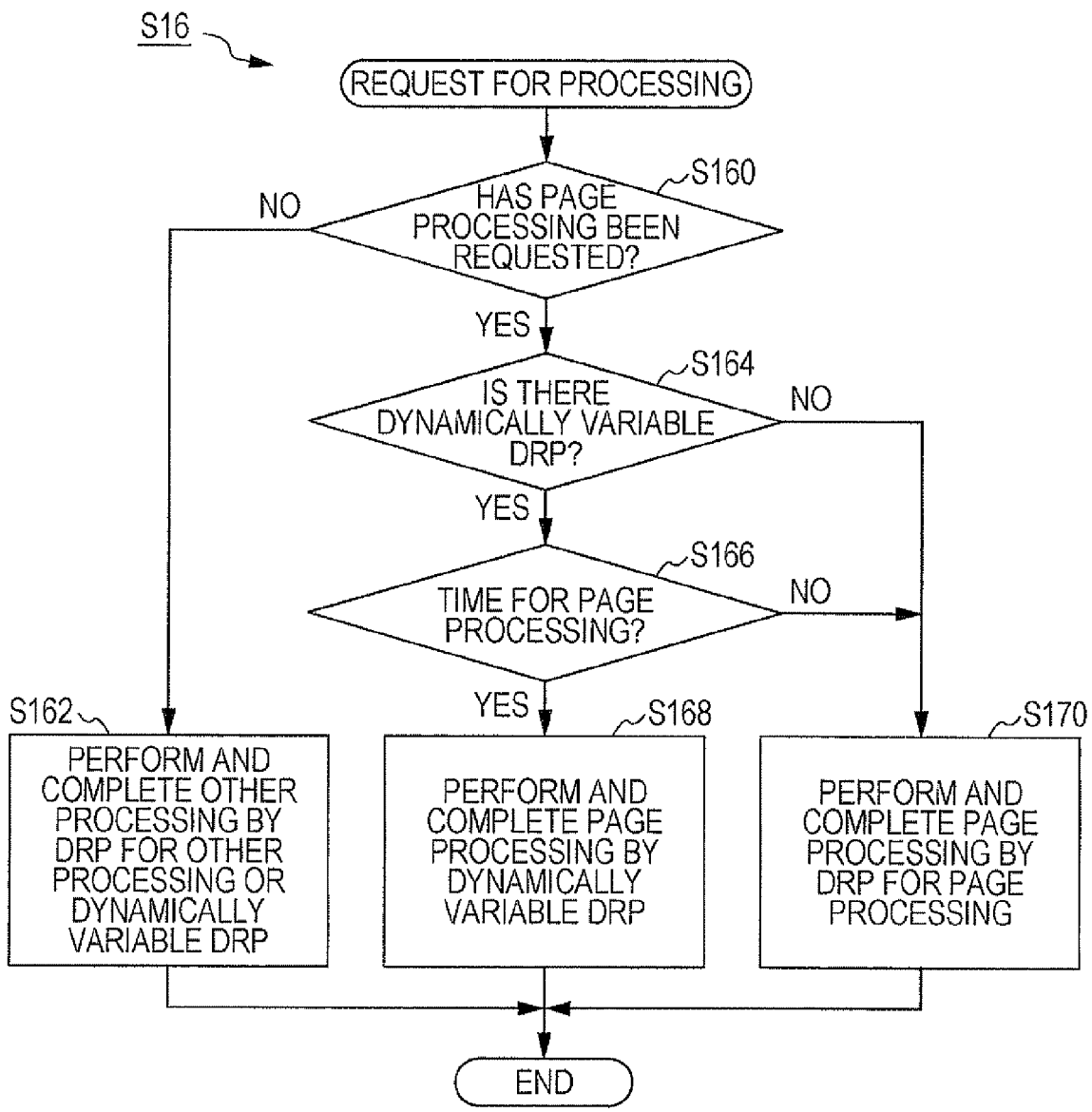
FIG. 7 is a flowchart illustrating a modification of the operation of the image processing/control apparatus illustrated in FIG. 2 and the image processing control program illustrated in FIG. 4.

FIG. 7 is a flowchart illustrating a modification (S16) of the operation of the image processing/control apparatus 2 illustrated in FIG. 2 (image processing control program 20 illustrated in FIG. 4).

In step S160, the non-DRP processing unit 210 determines whether page processing has been requested via the UI device 106 or the like.

If page processing has been requested, the image processing control program 20 proceeds to step S164. Otherwise, the image processing control program 20 proceeds to step S162.

In step S162, the DRP group management unit 206 causes the DRP 12 for other processing or the dynamically variable DRP 12 to perform and complete processing other than page processing.

In step S164, the DRP group management unit 206 determines whether there exists a dynamically variable DRP 12 among the DRPs 12.

If the dynamically variable DRP 12 exists among the DRPs 12, the image processing control program 20 proceeds to step S166. Otherwise, the image processing control program 20 proceeds to step S170.

In step S166, the DRP group management unit 206 determines whether the current time is a time when page processing may be requested to the dynamically variable DRP 12.

If the current time is a time when page processing may be requested to the dynamically variable DRP 12, the image processing control program 20 proceeds to step S168. Otherwise, the image processing control program 20 proceeds to step S170.

In step S168, the DRP group management unit 206 requests the DRP management unit 208 corresponding to the dynamically variable DRP 12 to perform page processing, and the DRP management unit 208 causes the dynamically variable DRP 12 to perform the page processing, as described above with reference to FIGS. 5 and 6.

In step S170, the DRP group management unit 206 requests the DRP 12 for page processing that has a processing ability for the requested page processing to perform the page processing, thereby causing the DRP 12 to perform the page processing.

[Second Exemplary Embodiment]

Hereinafter, a second exemplary embodiment of the invention will be described.

Figure 8:
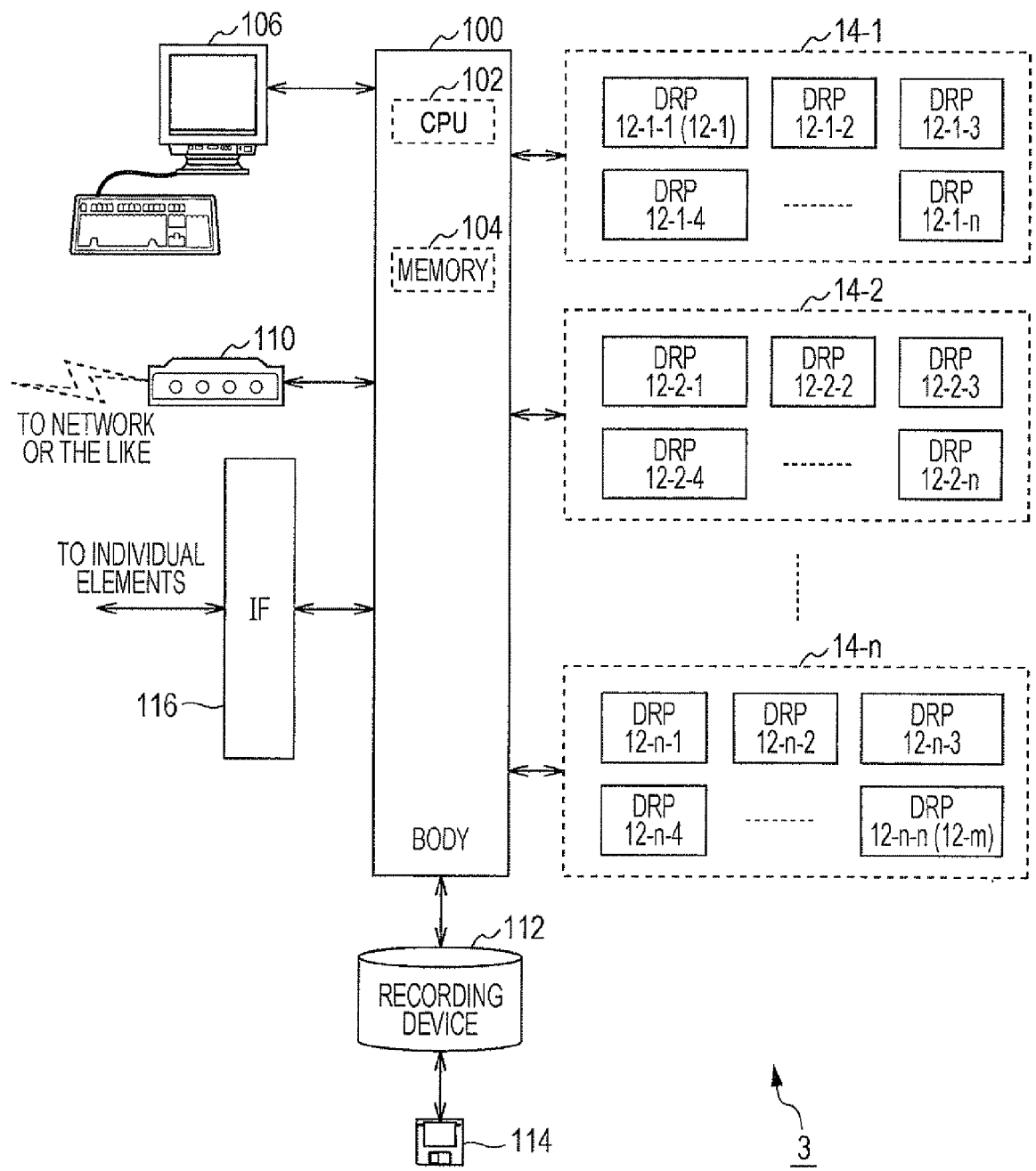
FIG. 8 is a diagram illustrating a configuration of an image processing/control apparatus according to a second exemplary embodiment of the invention.

FIG. 8 is a diagram illustrating a configuration of an image processing/control apparatus 3, which is used instead of the image processing/control apparatus 2 in the printer apparatus 1 illustrated in FIG. 1.

Figure 9:
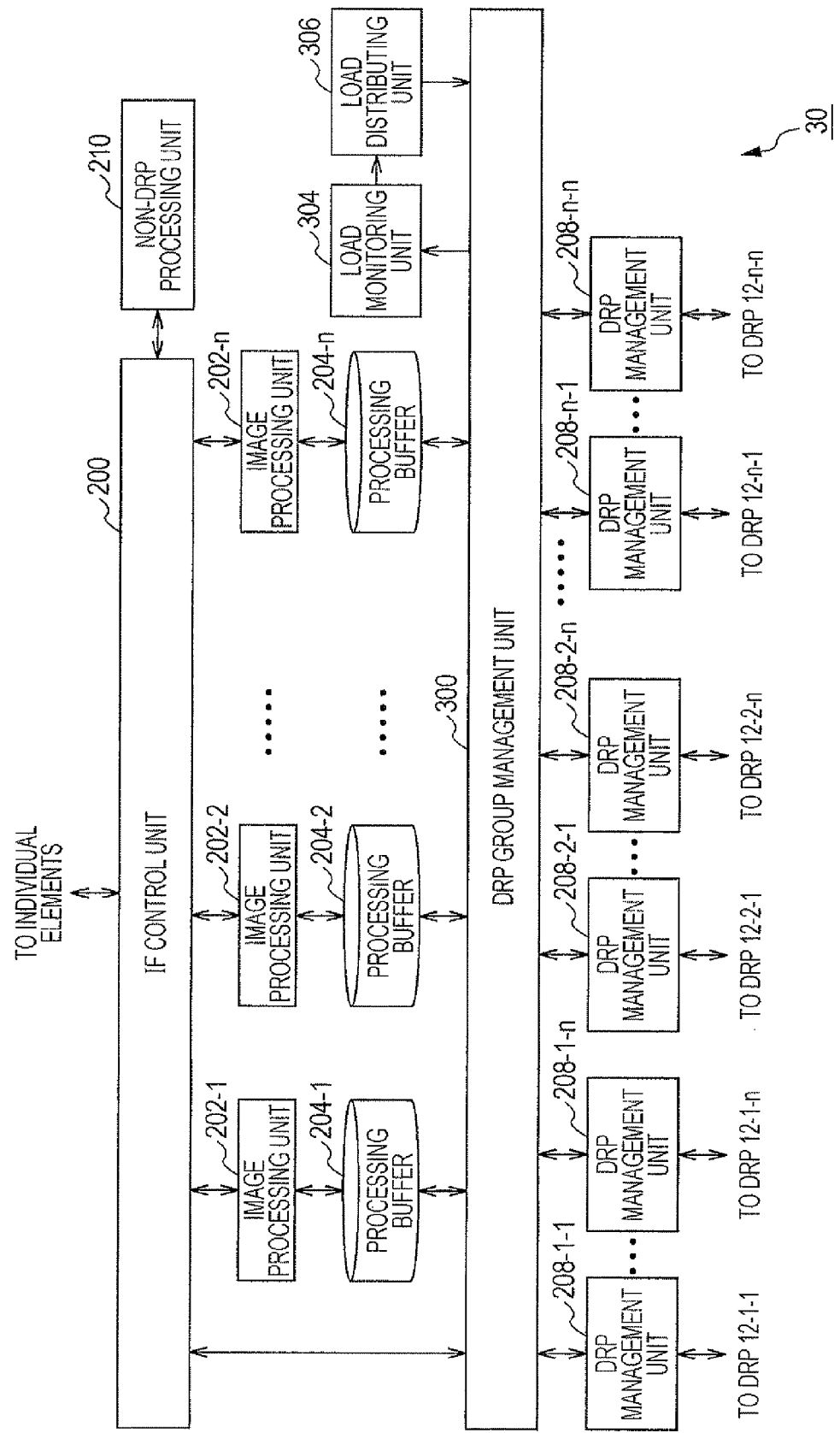
FIG. 9 is a diagram illustrating a configuration of an image processing control program according to the second exemplary embodiment, which is performed by the image processing/control apparatus illustrated in FIG. 8.

FIG. 9 is a diagram illustrating a configuration of an image processing control program 30 that is performed in the image processing/control apparatus 3 illustrated in FIG. 8.

The image processing/control apparatus 3 illustrated in FIG. 8 is used instead of the image processing/control apparatus 2 (FIG. 2) in the printer apparatus 1.

There is no substantial difference in hardware configuration between the image processing/control apparatus 2 and the image processing/control apparatus 3.

That is, FIG. 8 illustrates that, in the image processing/control apparatus 3, the DRPs 12-1 to 12-n correspond to n processing units that constitute image data on which processing is to be performed in the image processing/control apparatus 3 (logical pages, documents, etc.), and are used while being grouped into DRP groups 14-1 to 14-n, each including n DRPs 12, in accordance with the process of the image processing control program 30 illustrated in FIG. 9.

As illustrated in FIG. 9, differences between the image processing control program 20 and the image processing control program 30 are that the DRP group management unit 206 (FIG. 4) is replaced by a DRP group management unit 300 and that a load monitoring unit 304 and a load distributing unit 306 are added.

With this configuration, like the image processing control program 20, the image processing control program 30 uses each of the DRPs 12 as a DRP 12 for page processing, a DRP 12 for other processing, or a dynamically variable DRP 12, and performs processing control similar to that performed by the image processing control program 20. Also, the image processing control program 30 groups the DRPs 12 into DRP groups 14 in units of processing as described above, and performs image processing by distributing the load of the image processing in each of the DRP groups 14 or among the plural DRP groups 14 in accordance with the control performed by the load distributing unit 306.

In the image processing control program 30, the load monitoring unit 304 monitors the processing load of each of the DRP groups 14 and each of the DRPs 12 included in each of the DRP groups 14, and outputs a monitoring result, that is, the amount of processing load of each of the DRP groups 14 and each of the DRPs 12, to the load distributing unit 306.

On the basis of the amount of processing load of each of the DRP groups 14 and each of the DRPs 12 input from the load monitoring unit 304, the load distributing unit 306 controls the DRP group management unit 300 to perform processing control illustrated in FIGS. 3B to 3E and 4 to 7 according to the first exemplary embodiment by grouping the DRPs 12 into the DRP groups 14, and to distribute the load of image processing among the DRP groups 14.

As will be described below, the DRP group management unit 300 distributes the load among the DRP groups 14 in accordance with the control performed by the load distributing unit 306.

Also, the DRP group management unit 300 groups the DRPs 12 illustrated in FIGS. 8 and 9 into the DRP groups 14, and assigns each of the DRPs 12 included in each of the DRP groups 14 to a DRP 12 for page processing, a DRP 12 for other processing, or a dynamically variable DRP 12, like the DRP group management unit 206 (FIG. 4).

Also, like the DRP group management unit 206 (FIG. 4), the DRP group management unit 300 performs image processing control using the dynamically variable DRP 12 (see FIGS. 3B to 3E) by grouping the DRPs 12 into the DRP groups 14.

Hereinafter, a process performed by the load distributing unit 306 will be described using a specific example.

Figures 10A, 10B, 10C:
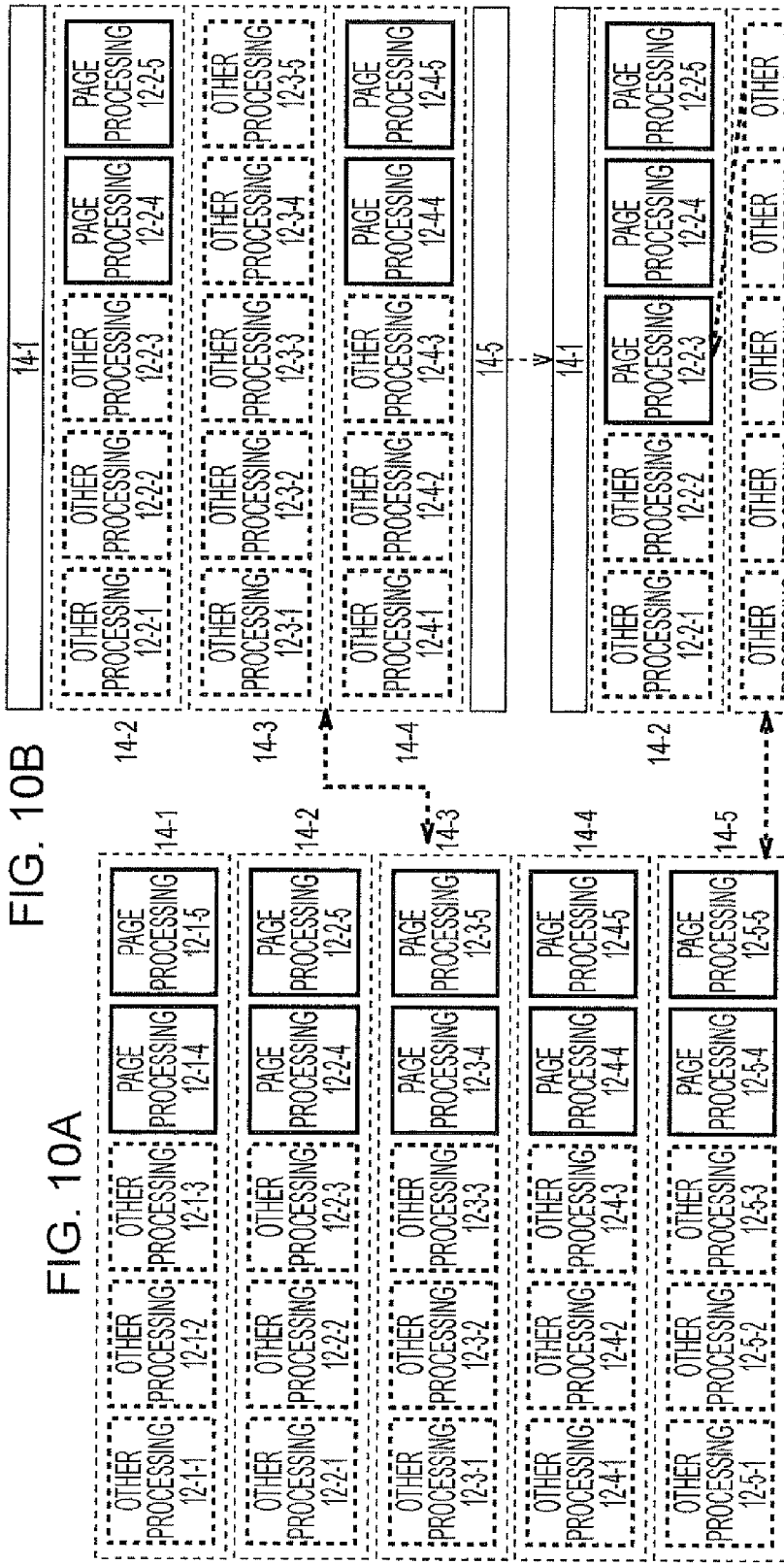
FIGS. 10A to 10C are diagrams illustrating an example of a process performed by a load distributing unit illustrated in FIG. 9.

FIGS. 10A to 10C are diagrams illustrating the process performed by the load distributing unit 306 illustrated in FIG. 9. FIG. 10A illustrates n DRPs 12-1 to 12-n, each serving as a DRP 12 for page processing or a DRP 12 for other processing, included in each of the n DRP groups 14-1 to 14-n. FIG. 10B illustrates a case where the amount of processing other than page processing in a certain DRP group 14 increases and all the DRPs 12 for page processing in the certain DRP group 14 are changed to DRPs 12 for other processing. FIG. 10C illustrates a case where DRPs 12 for page processing included in other DRP groups 14 illustrated in FIG. 10B are used as DRPs 12 for page processing that perform the page processing of the certain DRP group 14 on behalf of the DRPs 12 for page processing that have been changed to the DRPs 12 for other processing in the certain DRP group 14.

In FIGS. 10A to 10C, n is five for the purpose of clear and specific illustration. In FIG. 10A, among the DRPs 12-$i$-1 to 12-$i$-5 included in the DRP group 14-$i$, the DRPs 12-$i$-1 to 12-$i$-3 serve as DRPs 12 for other processing, the DRPs 12-$i$-4 and 12-$i$-5 serve as DRPs 12 for page processing, and a dynamically variable DRP 12 is omitted, in accordance with the DRP group management unit 300.

FIGS. 10B and 10C illustrate a case where the amount of processing other than page processing has become too large. Similar processing is performed if the amount of page processing has become too large.

FIG. 10B illustrates a case where all the DRPs 12 for page processing in the DRP group 14-3 are changed to DRPs 12 for other processing. When the amount of load of processing other than page processing is lighter, a portion of the DRPs 12 for page processing in the DRP group 14-3 may be changed to a DRP 12 for other processing.

For example, as illustrated in FIG. 10A, each of the DRPs 12 included in the individual DRP groups 14 is assigned to a DRP 12 for page processing or a DRP 12 for other processing by the DRP group management unit 300, so that image processing is performed.

In any of the DRP groups 14, the DRPs 12-$i$-1 to 12-$i$-3 perform only processing other than page processing, and the DRPs 12-$i$-4 and 12-$i$-5 perform only page processing as illustrated in FIG. 10A, unless the amount of load of page processing or other processing becomes too large.

The load distributing unit 306 detects that, in the amount of processing load in the individual DRP groups 14 and DRPs 12 input from the load monitoring unit 304, the load of processing other than page processing in the DRP group 14-3 has exceeded the processing ability of the DRPs 12-3-1 to 12-3-3 for other processing illustrated in FIG. 10A. Then, when determining that page processing is not being performed in the DRP group 14-3, the load distributing unit 306 controls the DRP group management unit 300 to change all the DRPs 12 for page processing in the DRP group 14-3 to DRPs 12 for other processing, as illustrated in FIG. 10B.

When the necessity of performing page processing in the DRP group 14-3 arises in the DRP group management unit 300 and when it is determined that the amount of processing load of the individual DRP groups 14 and DRPs 12 input from the load monitoring unit 304 has an allowance corresponding to the processing ability of one DRP 12 for other processing in other DRP groups 14 (e.g., the DRP groups 14-2 and 14-4), the load distributing unit 306 controls the DRP group management unit 300 to change the DRPs 12-2-3 and 12-4-3 for other processing in the DRP groups 14-2 and 14-4 to DRPs 12 for page processing in the DRP group 14-3, so as to cause the DRPs 12-2-3 and 12-4-3 to perform page processing on behalf of the DRPs 12-3-4 and 12-3-5 in the DRP group 14-3, as illustrated in FIG. 10C.

In the above-described specific example, the load distributing unit 306 shifts the assignment of the DRPs 12 from the state illustrated in FIG. 10A to the state illustrated in FIG. 10B, and then to the state illustrated in FIG. 10C. Depending on the status of the amount of load of the individual DRP groups 14 and DRPs 12, the load distributing unit 306 may directly shift the assignment of the DRPs 12 from the state illustrated in FIG. 10A to the state illustrated in FIG. 10C.

If the load distributing unit 306 determines that the amount of processing other than page processing in the DRP group 14-3 has become equal to or smaller than the amount that may be handled with the processing ability of the DRPs 12-3-1 to 12-3-3, as illustrated in FIG. 10A, on the basis of the amount of processing load of the individual DRP groups 14 and DRPs 12 input from the load monitoring unit 304, the load distributing unit 306 controls the DRP group management unit 300 to return the assignment of the DRPs 12 in the DRP groups 14-2 to 14-4 from the state illustrated in FIG. 10B or 10C to the state illustrated in FIG. 10A.

[Third Exemplary Embodiment]

Hereinafter, a third exemplary embodiment of the invention will be described.

Figure 11A:
FIG. 11A illustrates a procedure of an image processing operation performed between a DRP management unit and a DRP.
Figure 11B:
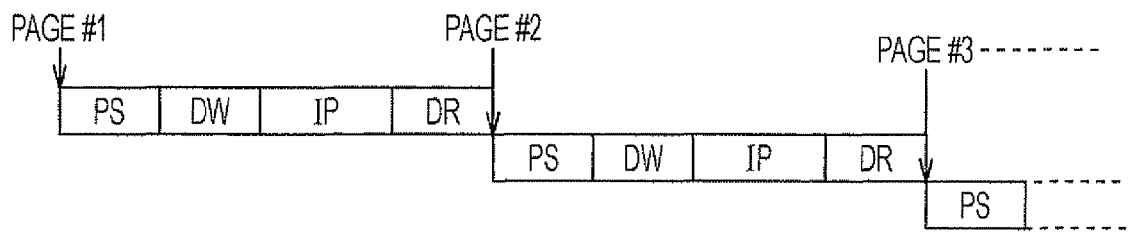
FIG. 11B illustrates a case where plural image processing operations are performed in series.
Figure 11C:
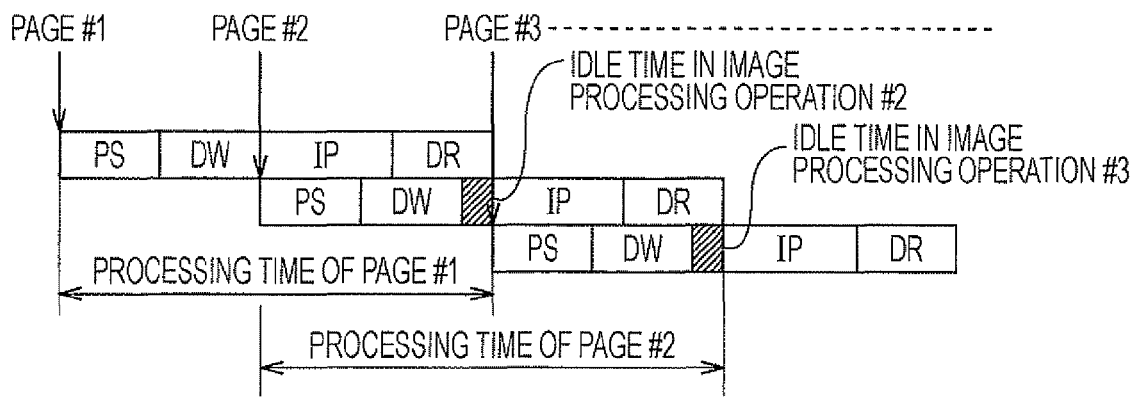
FIG. 11C illustrates a case where plural image processing operations are performed in parallel at arbitrary timings.
Figure 11D:
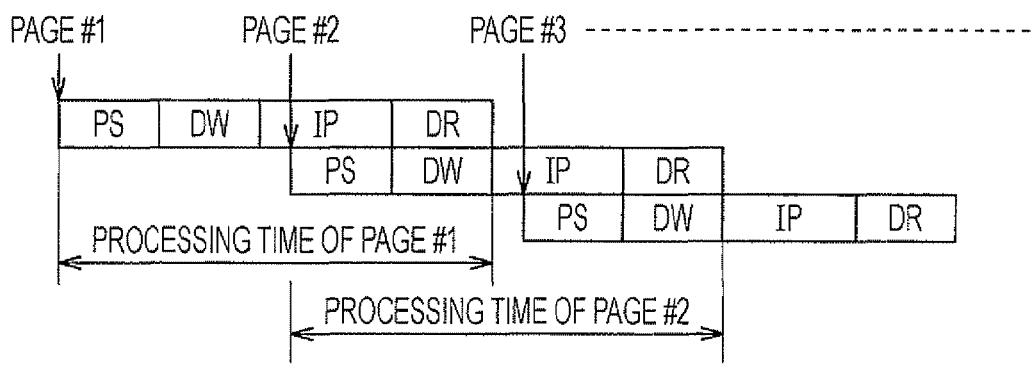
FIG. 11D illustrates a case where plural image processing operations are performed in parallel so that the performance time of each image processing operation is minimized.

FIGS. 11A to 11D are diagrams illustrating parallel performance of image processing operations in the DRPs 12 of the image processing/control apparatus 2 or 3 (FIGS. 1, 2, and 8). FIG. 11A illustrates a procedure of an image processing operation that is performed between the DRP management unit 208 and the DRP 12. FIG. 11B illustrates a case where plural image processing operations #1 to #n are performed in series. FIG. 11C illustrates a case where performances of plural image processing operations #1 to #n are requested to the DRP management unit 208 at arbitrary timings and the image processing operations #1 to #n are performed in parallel. FIG. 11D illustrates a case where performances of plural image processing operations #1 to #n are requested to the DRP management unit 208 and the image processing operations #1 to #n are performed in parallel so that the performance time of each of the image processing operations #1 to #n is minimized.

In FIGS. 11B to 11D, it is assumed that n=3.

In the image processing/control apparatuses 2 and 3 (FIGS. 1, 2, and 8) and an image processing/control apparatus 4 that will be described below with reference to FIG. 12, a program for image processing including a command and a parameter is set (program setting (PS)) to the DRP 12 from the DRP management unit 208 (see FIGS. 4 and 9) for performance of the image processing, as illustrated in FIG. 11A. Furthermore, image data on which image processing is to be performed is written on the I/O buffer 122 of the DRP 12 from the DRP management unit 208 (data writing (DW)).

In response to a request for starting image processing from the DRP management unit 208, or after program setting (PS) and image data writing (DW) have ended, the configuration of the reconfigurable processor 120 of the DRP 12 is changed in accordance with the command and parameter included in the program, and image processing (IP) is performed.

After the image processing (IP) has ended, the DRP management unit 208 is notified of that fact, and the DRP management unit 208 reads data that is obtained as a result of the image processing (data reading (DR)) via the I/O buffer 122 in accordance with the notification.

That is, an image processing operation is typically performed in accordance with a procedure that includes program setting (PS) from the DRP management unit 208 to the DRP 12, image data writing (DW), image processing (IP) performed by the DRP 12, and data reading (DR) of reading data obtained as a result of the image processing from the DRP 12 to the DRP management unit 208.

Note that the image processing (IP) illustrated in FIG. 11A is composed of plural stages illustrated in FIG. 3A and may be a target of control in the forms illustrated in FIGS. 3B to 3E and the forms illustrated in FIGS. 10A to 100.

When plural image processing operations having the same priority level, for example, plural RIP operations, are to be performed by using one DRP 12, a series performance method illustrated in FIG. 11B may be used in which the next image processing operation is performed after the previous image processing operation ends.

However, each of program setting (PS), image data writing (DW), and data reading (DR) of reading data obtained as a processing result is performed via the I/O buffer 122 of the DRP 12. Thus; the DRP management unit 208 may perform those processes at substantially arbitrary timings, as illustrated in FIG. 11C.

If program setting to the DRP 12 and image data writing (PS and DW) are performed at too early timing without considering the timing of the end of image processing (IP) that is being performed by the DRP 12, an idle time occurs between DW and IP as illustrated in FIG. 11C.

In contrast, if program setting to the DRP 12 and image data writing (PS and DW) are performed at too late timing, an idle time occurs between performance of certain image processing (IP) and performance of next image processing (IP), and only part of the processing ability of the DRP 12 is available for image processing.

On the other hand, as illustrated in FIG. 11D, if program setting to the DRP 12 and image data writing (PS and DW) are performed at optimum timing in view of the timing of the end of the image processing (IP) that is being performed by the DRP 12, no idle time occurs between DW and IP and between performance of certain image processing (IP) and performance of next image processing (IP), so that the processing ability of the DRP 12 may be 100% used for image processing.

According to the third exemplary embodiment of the invention, performances of plural image processing operations are requested to the DRP 12 at optimum timings as illustrated in FIG. 11D, so that the processing ability of the DRP 12 may be effectively used.

As is understood from the comparison between FIGS. 11C and 11D, if performance of image processing operations is controlled in the manner illustrated in FIG. 11C, the time from when the DRP management unit 208 issues an image processing operation #2 until when the DRP management unit 208 obtains the result is longer than the time from when the DRP management unit 208 issues an image processing operation #1 until when the DRP management unit 208 obtains the result, although the two image processing operations #1 and #2 have the same content.

On the other hand, if the two image processing operations #1 and #2 that have the same content are performed by controlling performance of the image processing operations in the manner illustrated in FIG. 11D, the time from when the DRP management unit 208 issues the image processing operation #1 until when the DRP management unit 208 obtains the result is equal to the time from when the DRP management unit 208 issues the image processing operation #2 or a subsequent image processing operation until when the DRP management unit 208 obtains the result. Accordingly, the time from when the DRP management unit 208 issues the image processing operation #2 or a subsequent image processing operation until when the DRP management unit 208 obtains the result is shorter than in the case illustrated in FIG. 11C.

Figure 12:
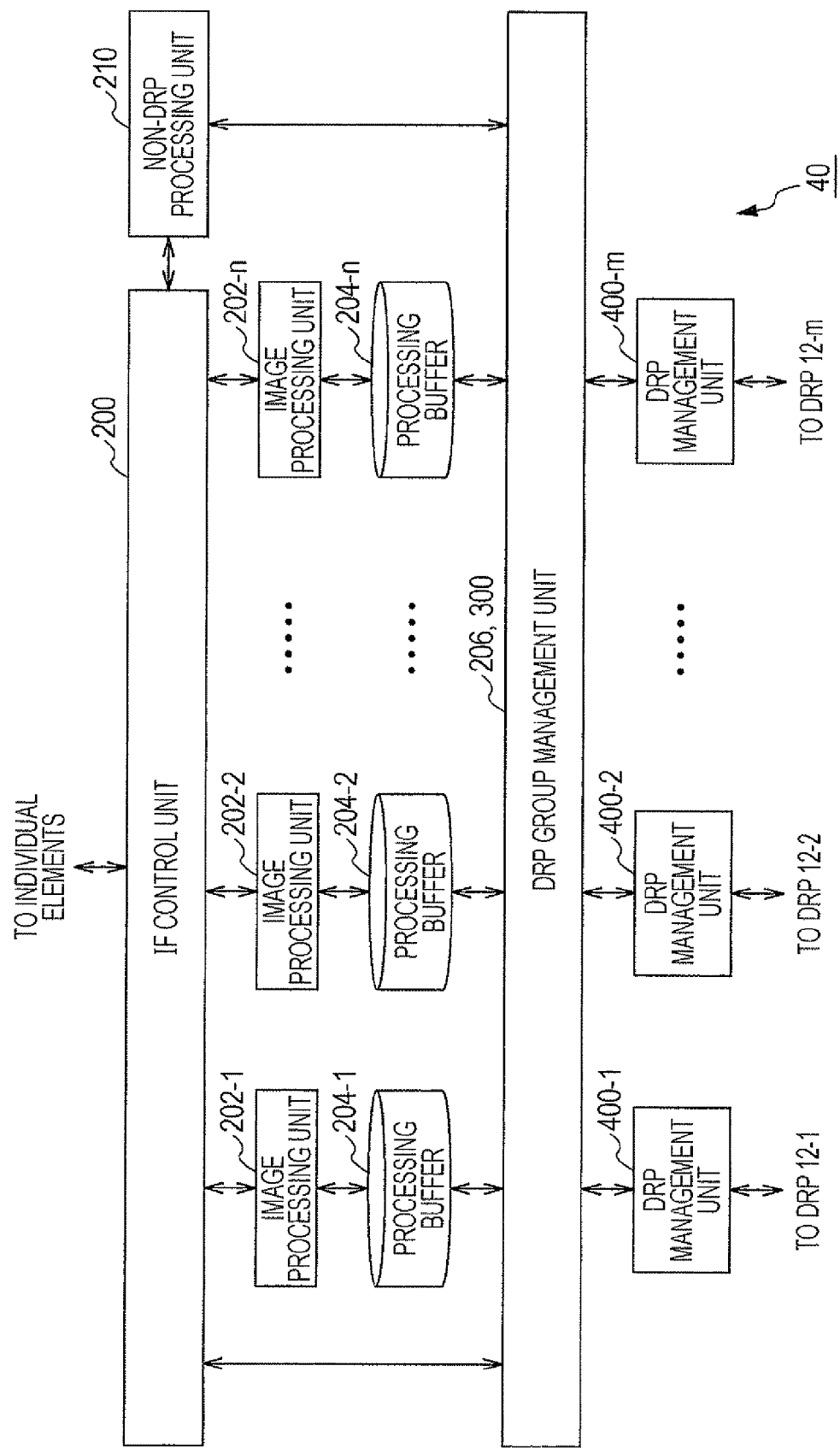
FIG. 12 is a diagram illustrating a configuration of an image processing control program according to a third exemplary embodiment of the invention.

FIG. 12 is a diagram illustrating a configuration of an image processing control program 40 that is used instead of the image processing control program 20 or 30 (FIGS. 4 and 9) in the image processing/control apparatus 2 or 3 (FIGS. 1, 2, and 8).

As illustrated in FIG. 12, the image processing control program 40 is different from the image processing control program 20 (FIG. 4) for the image processing/control apparatus 2 (FIGS. 1 and 2) in that the DRP management units 208 are replaced by DRP management units 400.

Note that the DRP group management unit 206 in the image processing control program 40 may be replaced by the DRP group management unit 300 in the image processing control program 30.

In the image processing control program 40, the DRP management unit 400 performs, in addition to the process performed by the DRP management unit 208 in the image processing control program 20, a process for program setting to the DRP 12 and image data writing (PS and DW) at the optimum timing illustrated in FIG. 11D in view of the timing of the end of the image processing (IP) that is being performed when plural image processing operations are requested, as described above with reference to FIGS. 11A to 11D.

Figure 13:
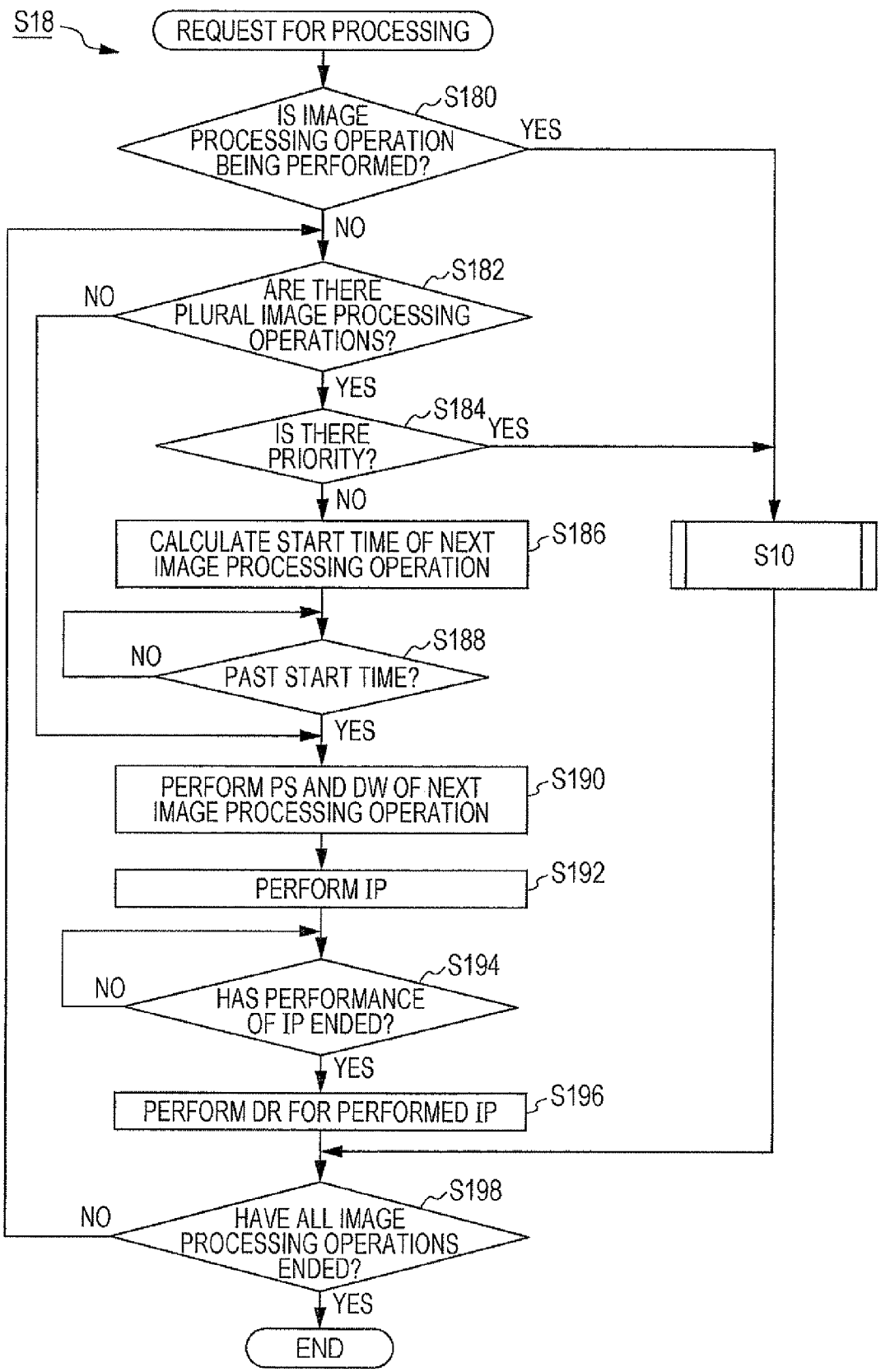
FIG. 13 is a flowchart illustrating an operation of controlling one or more image processing operations, performed in accordance with the image processing control program illustrated in FIG. 12.

FIG. 13 is a flowchart illustrating an operation (S18) of controlling, with the image processing control program 40 illustrated in FIG. 12, plural image processing operations that may be requested.

The control operation illustrated in FIG. 13 is based on the assumption that the time required for PS and DW and the time required for DR in each image processing operation are much shorter than the time required for IP in each image processing operation, in view of the time actually required for PS, DW, IP, and DR (FIG. 11A) of the image processing operation.

When receiving a request for an image processing operation from the image processing unit 202 via the processing buffer 204 and the DRP group management unit 206, the DRP management unit 400 determines whether an image processing operation is being performed in the corresponding DRP 12 in step S180.

If an image processing operation is being performed, the image processing control program 40 proceeds to S10 (FIGS. 5 and 6). Otherwise, the image processing control program 40 proceeds to step S182.

In step S182, the DRP management unit 400 determines whether there are plural image processing operations that are to be performed.

If there are plural image processing operations that are to be performed, the image processing control program 40 proceeds to step S184. Otherwise, the image processing control program 40 proceeds to step S190.

In step S184, the DRP management unit 400 determines whether the plural image processing operations have a difference in priority level as that exists between the foregoing page processing and other processing.

If there is a difference in priority level, the image processing control program 40 proceeds to step S10. Otherwise, the image processing control program 40 proceeds to step S186.

In step S186, a start time when program setting (PS in FIG. 11A) of the image processing operation that is to be preferentially started at the time (next image processing operation) is to be started is calculated.

The start time is obtained by adding the time when step S186 is being performed, the amount of remaining processing of the image processing operation that is already in a state of IP (FIG. 11A) at the time, and a remaining time of the IP state that is obtained from the processing ability of the DRP 12, and by subtracting the time required for PS and DW of the next image processing operation from the sum obtained through the foregoing addition.

In step S188, the DRP management unit 400 determines whether the time when the processing operation is being performed is past the start time of the next image processing operation calculated in step S186.

If the time is past the start time of the next image processing operation, the image processing control program 40 proceeds to step S190. Otherwise, the image processing control program 40 remains at step S188.

In step S190, the DRP management unit 400 performs PS and DW of the next image processing operation.

In step S192, after PS and DW of the next image processing operation end, the DRP management unit 400 causes the reconfigurable processor 120 to start the next image processing (IP) as necessary.

In step S194, it is determined whether the performance of IP of the image processing operation started in steps S190 and S192 has ended.

If the performance of IP of the image processing operation has ended, the image processing control program 40 proceeds to step S196. Otherwise, the image processing control program 40 remains at step S194.

In step S196, the DRP management unit 400 reads data that is obtained as a result of the performed image processing from the DRP 12 (DR).

In step S198, the DRP management unit 400 determines whether all the requested image processing operations have ended.

If all the requested image processing operations have ended, the image processing control program 40 ends the process. Otherwise, the image processing control program 40 returns to step S182.

The exemplary embodiments of the invention may be applied to image processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a reconfigurable processing unit that is configured to perform: i) first image processing on first image data, and ii) second image processing on second image data after completing the first image processing on the first image data; and
a controller that is configured to control the reconfigurable processing unit, wherein
the controller controls the reconfigurable processing unit so that a setting program for performing the second image processing is performed in parallel with the first image processing,
the reconfigurable processing unit is a dynamically reconfigurable processor that is configured to perform: i) the setting program for image processing including a command and a parameter, ii) a change of configuration of the dynamically reconfigurable processor in accordance with the command and the parameter included in the setting program after performing the setting program, and iii) image processing after changing the configuration of the dynamically reconfigurable processor, and
the controller starts the setting program for performing the second image processing substantially at a time of starting the first image processing.

2. An image processing apparatus comprising:
a reconfigurable processing unit that is configured to perform: i) first image processing on first image data, and ii) second image processing on second image data after completing the first image processing on the first image data; and
a controller that is configured to control the reconfigurable processing unit, wherein
the reconfigurable processing unit is a dynamically reconfigurable processor that is configured to perform: i) a setting program for image processing including a command and a parameter, ii) a change of configuration of the dynamically reconfigurable processor in accordance with the command and the parameter included in the setting program after performing the setting program, and iii) image processing after changing the configuration of the dynamically reconfigurable processor.
the controller is configured to control the reconfigurable processing unit so that the setting program for performing the second image processing is performed in parallel with the first image processing, and
the controller starts the setting program for performing the second image processing so that writing of the second image data ends substantially at a time when reading of the first image data ends.

3. The image processing apparatus according to claim 1, wherein the controller starts the setting program for performing the second image processing so that writing of the second image data ends substantially at a time when reading of the first image data ends.

4. The image processing apparatus according to claim 1, wherein the reconfigurable processing unit performs program setting, data writing, image processing, and data reading, and wherein the setting program includes the program setting.

5. An image processing method comprising:
performing first image processing on first image data and performing second image processing on second image data, using a reconfigurable processing unit, after completing the first image processing on the first image data; and
performing control, using a controller, so that a setting program for performing the second image processing is performed in parallel with the first image processing, wherein
the reconfigurable processing unit is a dynamically reconfigurable processor that is configured to perform: i) the setting program for image processing including a command and a parameter, ii) a change of configuration of the dynamically reconfigurable processor in accordance with the command and the parameter included in the setting program after performing the setting program, and iii) image processing after changing the configuration of the dynamically reconfigurable processor, and
the controller starts the setting program for performing the second image processing substantially at a time of starting the first image processing.

6. A non-transitory computer readable medium storing a program causing a computer to execute a process, the process comprising:
- performing first image processing on first image data and performing second image processing on second image data, using a reconfigurable processing unit, after completing the first image processing on the first image data; and
- performing control, using a controller, so that a setting program for performing the second image processing is performed in parallel with the first image processing, wherein
    - the reconfigurable processing unit is a dynamically reconfigurable processor that is configured to perform: i) the setting program for image processing including a command and a parameter, ii) a change of configuration of the dynamically reconfigurable processor in accordance with the command and the parameter included in the setting program after performing the setting program, and iii) image processing after changing the configuration of the dynamically reconfigurable processor, and
    - the controller starts the setting program for performing the second image processing so that writing of the second image data ends substantially at a time when reading of the first image data ends.

* * * * *